United States Patent
Wong (10) Patent No.: US 9,384,236 B2
(45) Date of Patent: Jul. 5, 2016

(54) METHOD AND SYSTEM FOR OPERATING ON DATABASE QUERIES

(71) Applicant: Joseph Wong, Vancouver (CA)

(72) Inventor: Joseph Wong, Vancouver (CA)

(73) Assignee: SAP SE, Walldorf (DE)

( * ) Notice: Subject to any disclaimer, the term of this patent is extended or adjusted under 35 U.S.C. 154(b) by 288 days.

(21) Appl. No.: 13/918,409

(22) Filed: Jun. 14, 2013

(65) Prior Publication Data

US 2014/0372466 A1  Dec. 18, 2014

(51) Int. Cl.
*G06F 17/30* (2006.01)

(52) U.S. Cl.
CPC .... *G06F 17/30392* (2013.01); *G06F 17/30427* (2013.01)

(58) Field of Classification Search
CPC .................. G06F 17/30967; G06F 17/30392; G06F 17/30427
USPC ........................................................ 707/760
See application file for complete search history.

(56) References Cited

U.S. PATENT DOCUMENTS

| | | | |
|---|---|---|---|
| 6,115,703 A | 9/2000 | Bireley et al. | |
| 6,341,281 B1 | 1/2002 | MacNicol et al. | |
| 6,721,724 B1 | 4/2004 | Galindo-Legaria et al. | |
| 6,789,071 B1 * | 9/2004 | Kapoor et al. | |
| 6,985,904 B1 | 1/2006 | Kaluskar et al. | |
| 7,100,167 B2 | 8/2006 | Novik et al. | |
| 7,174,326 B2 | 2/2007 | Ireland et al. | |
| 7,218,613 B1 | 5/2007 | Doskow et al. | |
| 7,251,776 B2 | 7/2007 | Handsaker et al. | |
| 7,483,879 B2 | 1/2009 | chang et al. | |
| 7,640,235 B2 * | 12/2009 | Shulman et al. | |
| 7,653,913 B2 * | 1/2010 | Novik et al. | 719/318 |
| 7,657,552 B2 * | 2/2010 | Welcker et al. | 707/999.102 |
| 7,778,997 B1 * | 8/2010 | Chapman et al. | 707/713 |
| 7,779,386 B2 | 8/2010 | Seitz et al. | |

(Continued)

FOREIGN PATENT DOCUMENTS

EP    1585036 A2    10/2005

OTHER PUBLICATIONS

"European Application Serial No. 11007721.1, Search Report mailed Jan. 2, 2013", 9 pgs.

(Continued)

*Primary Examiner* — Hosain Alam
*Assistant Examiner* — Saba Ahmed
(74) *Attorney, Agent, or Firm* — Fish & Richardson P.C.

(57) ABSTRACT

The present disclosure involves systems, software, and computer implemented methods for operating on database queries. One example method includes identifying a parameterized input query in a first database query language. The parameterized input query includes one or more parameter placeholders. A random value is generated, for each parameter placeholder. A concrete instance of the parameterized input query in the first database query language is constructed. The concrete instance of the parameterized input query replaces each parameter placeholder with the corresponding generated random value. A translated output query in a second database query language is generated, from the concrete instance of the parameterized input query. The translated output query includes the generated random values. Each of the generated random values are replaced within the translated output query in the second database query language with a placeholder value associated with the second database query language.

20 Claims, 7 Drawing Sheets

(56) References Cited

U.S. PATENT DOCUMENTS

| | | | |
|---|---|---|---|
| 7,958,113 B2* | 6/2011 | Fan et al. | 707/718 |
| 7,979,456 B2* | 7/2011 | Dettinger et al. | 707/765 |
| 7,987,178 B2* | 7/2011 | Hueske et al. | 707/713 |
| 8,082,322 B1 | 12/2011 | Pascarella et al. | |
| 8,087,092 B2 | 12/2011 | Richardson et al. | |
| 8,219,575 B2 | 7/2012 | Wong | |
| 8,285,755 B2 | 10/2012 | Chan et al. | |
| 2006/0224563 A1 | 10/2006 | Hanson et al. | |
| 2007/0203893 A1* | 8/2007 | Krinsky et al. | 707/3 |
| 2007/0276815 A1* | 11/2007 | Naibo et al. | 707/3 |
| 2010/0257154 A1* | 10/2010 | Pendap et al. | 707/718 |
| 2010/0293209 A1* | 11/2010 | Bireley et al. | 707/959 |
| 2011/0055231 A1* | 3/2011 | Huck et al. | 707/751 |
| 2013/0054630 A1 | 2/2013 | Briggs et al. | |
| 2013/0060795 A1 | 3/2013 | Plasek et al. | |
| 2013/0060803 A1 | 3/2013 | Maman et al. | |

OTHER PUBLICATIONS

Bisht, Prithvi, et al., "Automatically Preparing Save SQL Queries", Financial Crypotography and Data Security, LNCS 6052, [Online]/ Retrieved <URL: http://citeseerx.ist.psu.edu/viewdoc/summary?doi=10.1.1.115.1060>, (2010), 272-288.

Boyd, Stephen W., et al., "SQLrand: Preventing SQL Injection Attacks", Applied Cryptography and Network Security, LCNS 3089, (2004), 292-302.

Hu, Wei, et al., "Secure and Practical Defense Against Code-injection Attacks using Software Dynamic Translation", VEEE, (2006), 14-16.

Keromytis, Angelos D., "Randomized Instruction Sets and Runtime Environments Past Research and Future Directions", IEEE Security and Privacy vol. 7, No. 1, (Jan. 2009), 18-25.

Thomas, Stephen, et al., "On automated prepared statement generation to remove SQL injection vulnerabilities", Information and Software Technology 51, [Online]> Retrieved from the Internet: <URL: http://www.cs.washington.edu/homes/taoxie/publications/ist09-fix.pdf>, (2009), 589-598.

\* cited by examiner

ActiveRecord DSL Query –
Purchase.find(:all, :conditions => {:quantity => 42, :state => "CA", :city => "qWe", :color => "xYz"})
random_args = {:x => "qWe", :c => "xYz"}

FIG. 2C

SELECT * FROM purchases WHERE quantity = 42 AND state = 'CA' AND city = 'qWe' AND color = 'xYz'
random_args = {:x => "qWe", :c => "xYz"}

FIG. 2D

SELECT * FROM purchases WHERE quantity = 42 AND state = 'CA' AND city = ? AND color = ?
parameter_order = [:x, :c]

METHOD AND SYSTEM FOR OPERATING ON DATABASE QUERIES

TECHNICAL FIELD

The present disclosure relates to computer-implemented methods, software, and systems for operating on database queries.

BACKGROUND

In database operations, a prepared statement that parameterizes query search terms can be used to avoid a cost of repetitively parsing, compiling and optimizing similar queries. At query execution time, a parameter value can be supplied for each parameter. Prepared statement can be defined, for example, in a first database language. The prepared statement in the first database language can be translated to a corresponding prepared statement in a second database language.

SUMMARY

The present disclosure involves systems, software, and computer implemented methods for operating on database queries. One example method includes identifying a parameterized input query in a first database query language. The parameterized input query includes one or more parameter placeholders, and each parameter placeholder defines a parameter name and a declared parameter type. A random value of the declared parameter type is generated, for each parameter placeholder in the parameterized input query in the first database query language. A concrete instance of the parameterized input query in the first database query language is constructed. The concrete instance of the parameterized input query replaces each parameter placeholder with the corresponding generated random value of the declared parameter type. A translated output query in a second database query language is generated, from the concrete instance of the parameterized input query. The translated output query includes the generated random value of the declared parameter type. Each of the generated random values are replaced within the translated output query in the second database query language with a placeholder value associated with the second database query language.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A database developer can use a Domain Specific Language (DSL) to specify database queries. To execute a DSL query, the DSL query can be processed, which can include translating the DSL query into, for example, a SQL (Structured Query Language) query, and the SQL query can be executed by a particular database system. The processing of the DSL query can include a sanitation process which can replace certain characters with escape sequences to preserve data integrity and to prevent SQL injection attacks. An SQL injection attack can occur, for example, if SQL code is provided by a hacker in a user interface entry field. The sanitization process can slow query execution time, in proportion to the character length of an executed query statement.

ActiveRecord, which is a part of the Ruby on Rails application framework, can be used to translate a DSL query into an SQL query for execution. However, each time a DSL query is to be executed, processing time is used for parsing, compiling, and optimizing into an execution plan, even if a query to be executed differs from a previously executed query only in values of parameters. Prepared statements can be used to avoid re-parsing, re-compilation, and re-optimizing for queries that differ only in parameter values. However, ActiveRecord's translation feature acts as a black box that takes a DSL query as input and produces an SQL string as output, with all parameter values substituted and sanitized, which makes ActiveRecord not a suitable tool for producing parameterized queries. As described below, however, a method can be performed which takes as an input a query in a first database language (e.g., DSL) and produces as an output a parameterized query in a second database language (e.g., SQL).

Figure 1:
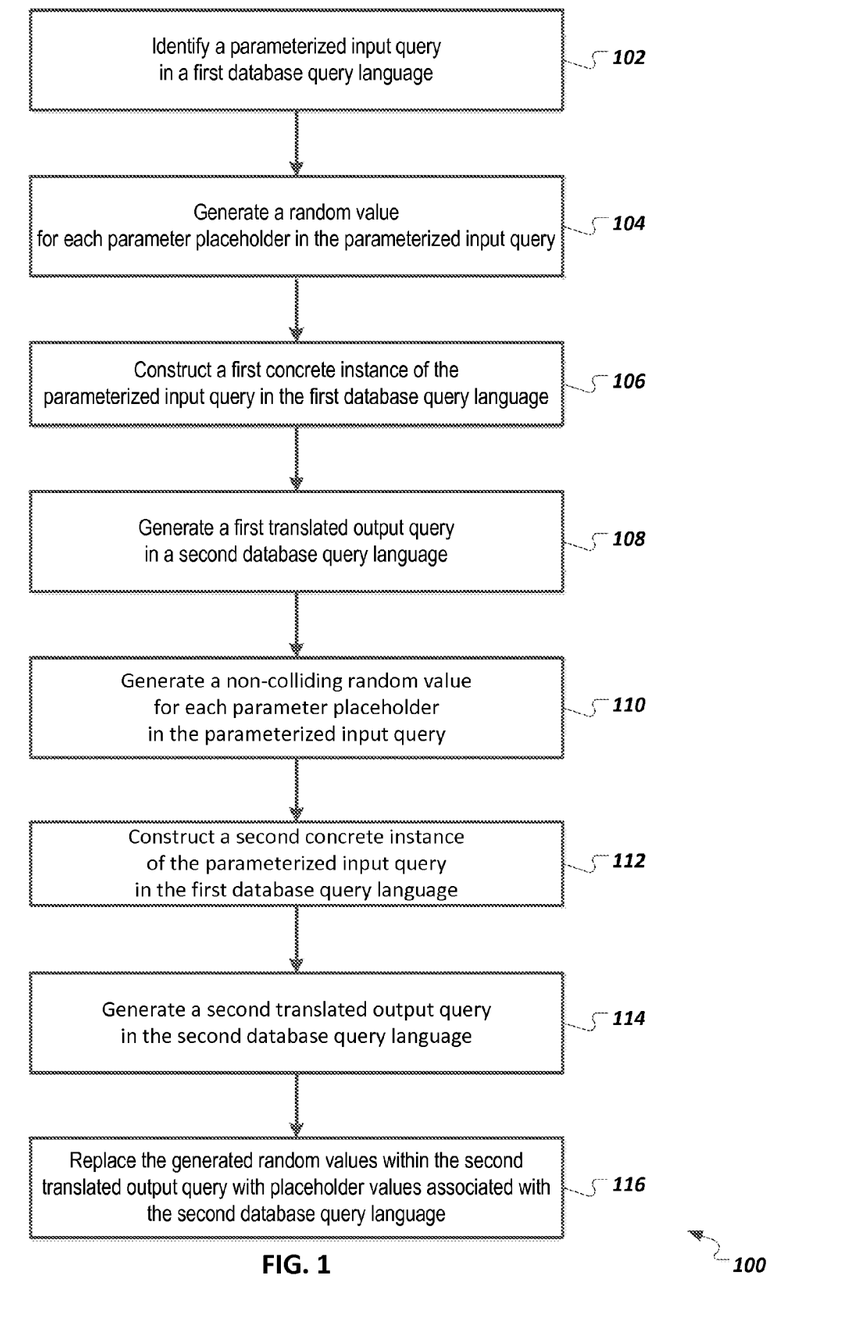
FIG. 1 is a flowchart of an example method for operating on database queries.

FIG. 1 is a flowchart of an example method 100 for operating on database queries. It will be understood that method 100 and related methods may be performed, for example, by any suitable system, environment, software, and hardware, or a combination of systems, environments, software, and hardware, as appropriate. For example, one or more of a client, a server, or other computing device can be used to execute method 100 and related methods and obtain any data from the memory of a client, the server, or the other computing device. In some implementations, the method 100 and related methods are executed by a system 600 described below with respect to FIG. 6.

At 102, a parameterized input query in a first database query language is identified. The parameterized input query includes one or more parameter placeholders, where each parameter placeholder defines a parameter name and a declared parameter type. Parameter types can include, for example, string, enumeration, integer, floating point value, date-time, or a list type, such as a list of strings or a list of integers. To execute the parameterized input query, a value can be assigned to each parameter. The first database language can be, for example, a DSL, such as an extension of the ActiveRecord query language from the Ruby on Rails framework. ActiveRecord can be used for specifying database queries using object-relational mapping.

Figure 2A:
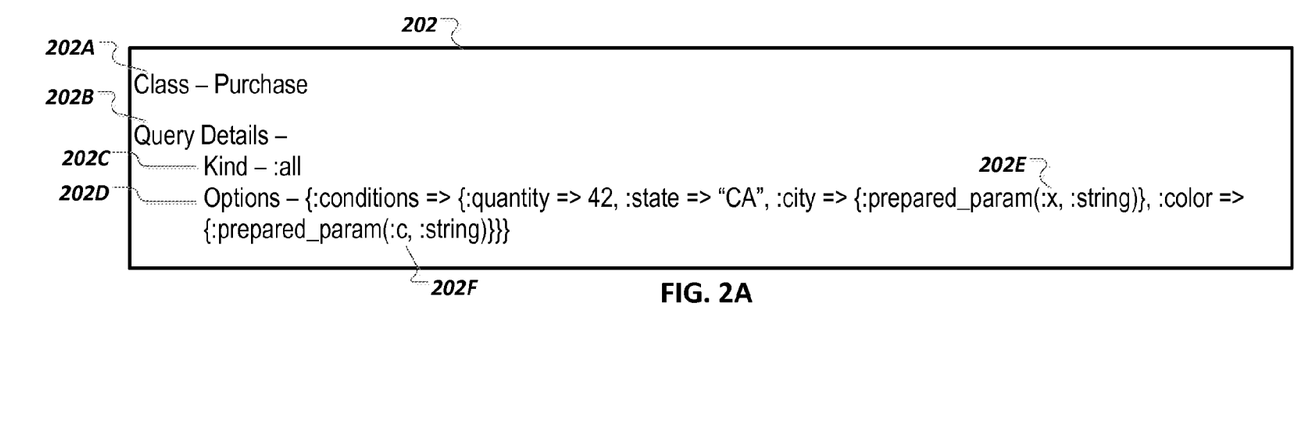
FIGS. 2A, 2B, and 2C illustrate example DSL (Domain Specific Language) code.

FIG. 2A illustrates an example DSL code portion 202. A class Purchase 202A is an object-oriented classification for a database query. In a query details section 202B, a parameter kind 202C is set to a value of 'all' to indicate that all results will be returned from a query defined by the code portion 202. Query options 202D indicate that a quantity field is to be set to a value of 42 (e.g., a number purchased), a state field is to be set to a value of 'CA' (e.g., a purchase origin), a city field is to be set to the value of a parametric string variable x 202E, and a color field is to be set to the value of a parametric string variable c 202F.

Figure 2B:
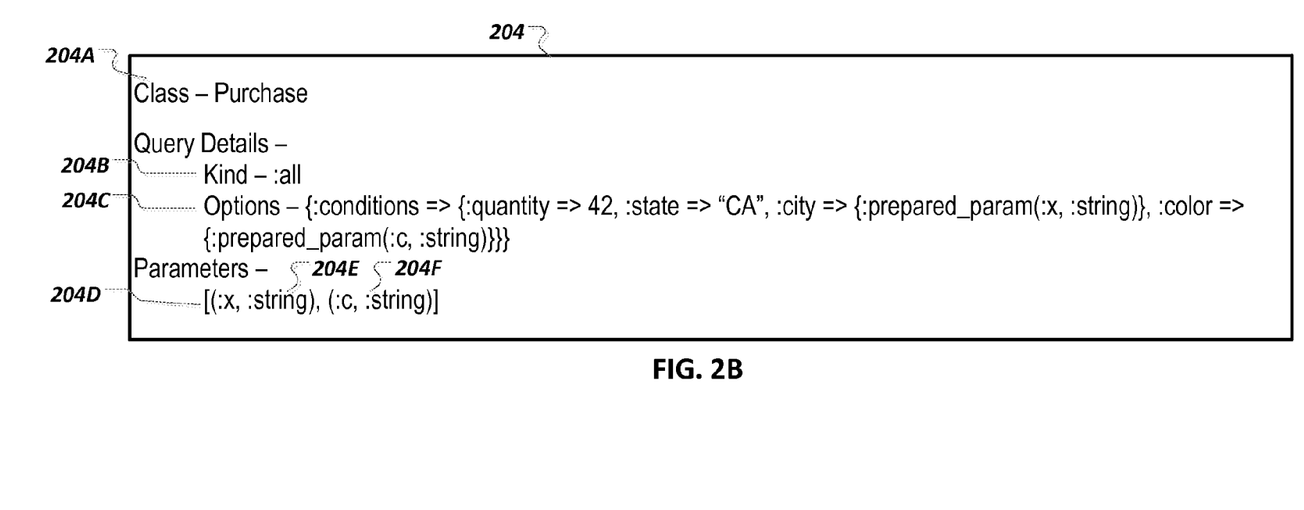

FIG. 2B illustrates a second DSL code portion 204. A class Purchase 204A, a kind parameter 204B, and query options 204C correspond, respectively, to the class 202A, the parameter 202C, and the query options 202D. Parameters 204D that are assigned values in order to execute a query in the first database query language (e.g., DSL) include a generic parameter x 204E and a generic parameter c 204E, corresponding to the parametric string variable x 202E and the parametric string variable c 202F, respectively.

Referring again to FIG. 1, at 104, a random value of a declared parameter type is generated for each parameter placeholder in the parameterized input query in the first database query language. For example, for a string parameter, a random string value can be generated and for an integer parameter, a random integer value can be generated. For instance, in the example of FIG. 2B, a first random string value (e.g., "qWe") can be generated for the string parameter x and a second random string value (e.g., "xYz") can be generated for the string parameter c. Conventional random number and/or random character generators can be used to generate random values, as well as any other suitable method of generating random numbers and/or characters. For example, upper and lower bounds may be specified for string lengths and integer values. In the case of a string variable, a string length may be randomly chosen (e.g., a length of 3) and a string value may be randomly chosen of the randomly-chosen string length. In some implementations, random values are generated so as to avoid colliding random values, as described in more detail below with respect to FIG. 3.

Referring again to FIG. 1, at 106, a concrete instance of the parameterized input query in the first database query language is constructed. In the concrete instance of the parameterized input query, each parameter placeholder is replaced with the corresponding generated random value of the declared parameter type.

Figure 2C:
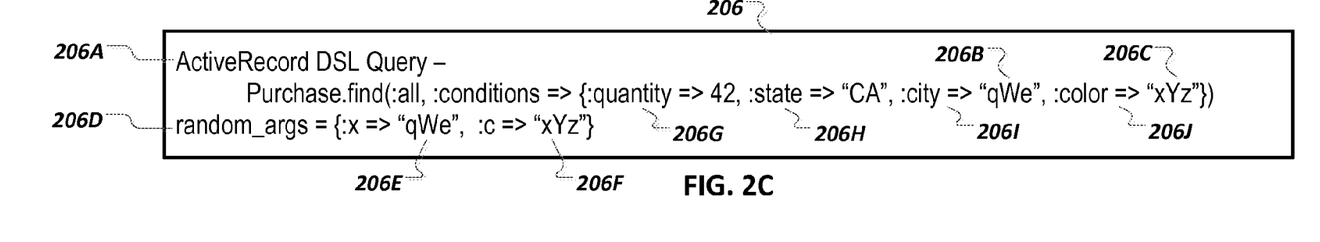

For example, FIG. 2C illustrates an example DSL code portion 206 which includes a DSL query 206A in which a city field is to be set to a first random string value 206B of "qWe" (e.g., replacing the parametric string variable x) and a color field is to be set to a second random string value 206C of "xYz" (e.g., replacing the parametric string variable c). Correspondingly, a random argument list 206D identifies a value 206E of "qWe" for the parameter x and a value 206F of "xYz" for the parameter c. The query 206A includes conditions 206G, 206H, 206I, and 206J that are associated with the quantity, state, city, and color fields, respectively.

Referring again to FIG. 1, at 108, a translated output query in a second database query language is generated from the concrete instance of the parameterized input query. The translated output query includes the generated random value(s) of the declared parameter type(s). The second database language can be, for example, SQL. One or more facilities provided by a development environment associated with the first database query language can be used to translate the concrete instance of the parameterized input query to the translated output query.

Figure 2D:
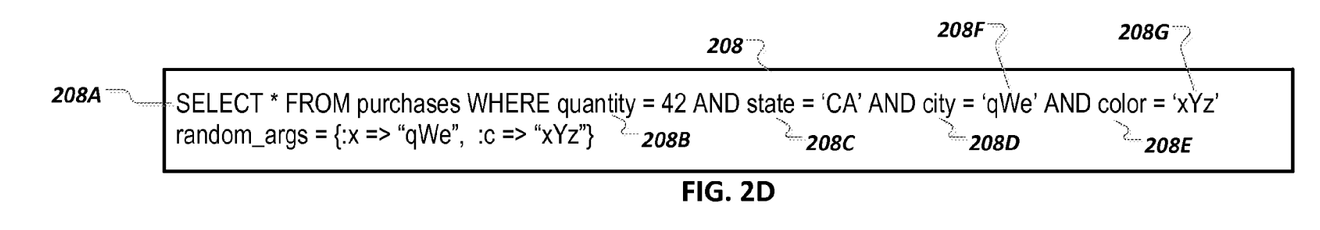
FIGS. 2D and 2E illustrate example SQL (Structured Query Language) code.

For example, FIG. 2D illustrates an example SQL code portion 208. The SQL code portion 208 defines an SQL query 208A which includes conditions 208B, 208C, 208D, and 208E. The conditions 208B, 208C, 208D, and 208E respectively correspond to the conditions 206G, 206H, 206I, and 206J included in the DSL code portion 206. The SQL query 208A includes generated random values 208F and 208G which correspond to the generated random values 206B and 206C, respectively.

At 110, the generated random values are replaced within the translated output query in the second database query language with corresponding placeholder values associated with the second database query language. For example, a "?" character can be inserted into the translated output query in place of each generated random value. As discussed in further detail below (e.g., FIG. 4, FIG. 5), a list-placeholder can be inserted for parameters that are a list parameter.

Figure 2E:
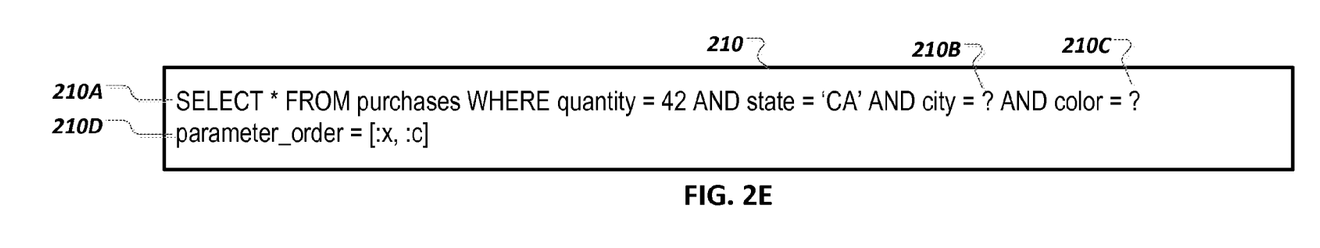
Figure 3:
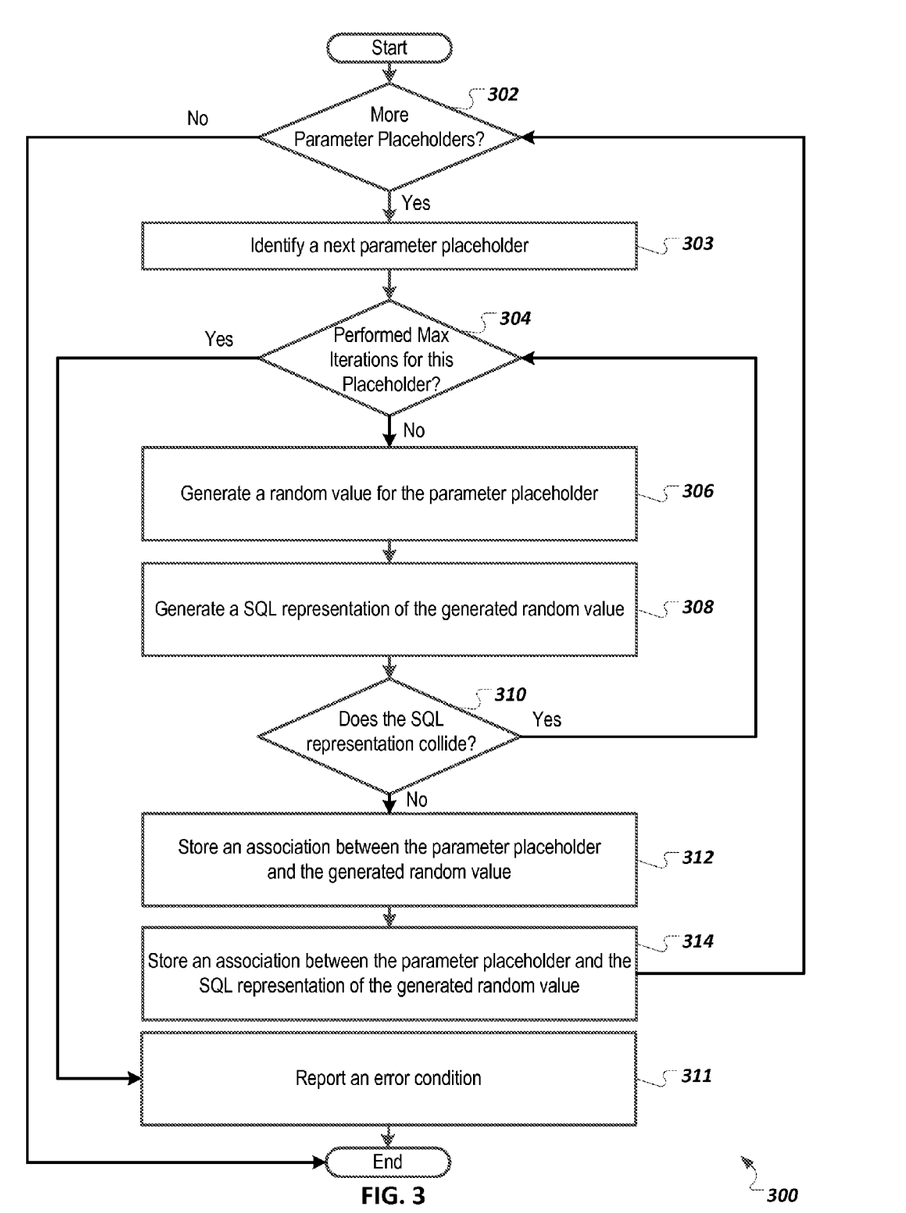
FIG. 3 is a flowchart of an example method for generating non-colliding random values.

FIG. 2E illustrates an example SQL code portion 210. The SQL code portion 210 defines an SQL query 210A. The SQL query 210A includes placeholders 210B and 210C which correspond to the generated random values 208F and 208G, and to x and c parameters included in a parameter list 210D, respectively FIG. 3 is a flowchart of an example method 300 for generating non-colliding random values. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by a system 600 described below with respect to FIG. 6.

At 302, a determination is made as to whether more parameter placeholders are to be processed. For example, the method 300 can include the processing of each parameter placeholder in an identified parameterized input query (e.g., the parameterized input query identified in operations 102 above). The determination at 302 can occur before any of the parameter placeholders are processed, as well as after one or more of the parameter placeholders have been processed.

If there are no more parameter placeholders to process, the method 300 ends. If there are more parameter placeholders to process, at 303, a next parameter placeholder is identified. For example, the parameterized input query can be processed from left to right, and a last processed position can be maintained. A next parameter placeholder that is to the right of the last processed position can be identified.

At 304, a determination is made as to whether a threshold number of processing iterations have been performed for the identified parameter placeholder. For example, the threshold number of processing iterations can be predefined to be a positive integer, such as ten.

If the threshold number of processing iterations has not been exceeded for the identified parameter placeholder, at 306, a random value is generated for the parameter placeholder. For example, for a string parameter, a random string value can be generated and for an integer parameter, a random integer value can be generated. Conventional random number and/or random character generators can be used to generate random values.

At 308, an SQL representation of the generated random value is generated. For example, for a parameter placeholder of type string, the SQL representation of the generated random value can include quoting in accordance with SQL literal string values (e.g., the SQL representation can be the generated random value surrounded by single quote characters).

At 310, a determination is made as to whether the SQL representation of the generated random value collides with a translated output query or with a previously generated SQL representation. For example, a determination can be made that the SQL representation of the generated random value does not collide if the SQL representation is not a substring of a translated output query such as the translated output query generated in operations 108 of the process 100, is not a substring of any other generated SQL representation of a random value associated with any other parameter placeholder, and does not contain as a substring any other generated SQL representation of a random value associated with any other parameter placeholder.

Consider the following examples where colliding values occur. If the translated output query is "SELECT*FROM purchases WHERE quantity=42 AND state='CA' AND city='qWe' AND color='xYz'", an example SQL representation of a generated random value having a value of the string 'CA' would collide with the translated output query because the SQL representation is a substring of the translated output query. As another example, if a previously generated SQL representation of a generated random value is the string 'xYz' and a subsequent SQL representation of a generated random value happens to also be 'xYz', then the subsequent SQL representation would collide with the previously generated SQL representation.

If the SQL representation of the generated random value collides, at 304, a determination is made as to whether the threshold number of processing iterations have been performed for the identified parameter placeholder. If the threshold number of processing iterations has been performed for the identified parameter placeholder, at 311, an error message is reported. In some implementations, the method 300 ends after the error message is reported.

If the threshold number of processing iterations have not been performed for the identified parameter placeholder, at 306, a new random value is generated for the parameter placeholder, and processing for the new generated random value is performed in a fashion similar to the processing for the previous generated random value (e.g., 308, 310).

If the SQL representation of the generated random value does not collide, then an association between the parameter placeholder and the generated random value is stored at 312. For example, the association between the parameter placeholder and the generated random value can be stored in a first associative array (or some other data structure, such as a hash data structure) that is indexed by parameter placeholder name.

At 314, an association between the parameter placeholder and the SQL representation of the generated random value is stored. For example, the association between the parameter placeholder and the SQL representation of the generated random value can be stored in a second associative array (or other data structure) that is indexed by values of SQL representations of generated random values. The second associative array can be referenced, for example, in determining whether the SQL representation of a generated random value collides with a previously generated SQL representation of a random value corresponding to some other parameter placeholder.

After 314 completes, method 300 returns to 302, where a determination is made as to whether more parameter placeholders are to be processed. If there are more parameter placeholders to process, a next parameter placeholder is identified at 303, and processing continues (e.g., at 304, etc.) for the next parameter placeholder. If no additional parameter placeholders are to be processed, method 300 may end.

Figure 4:
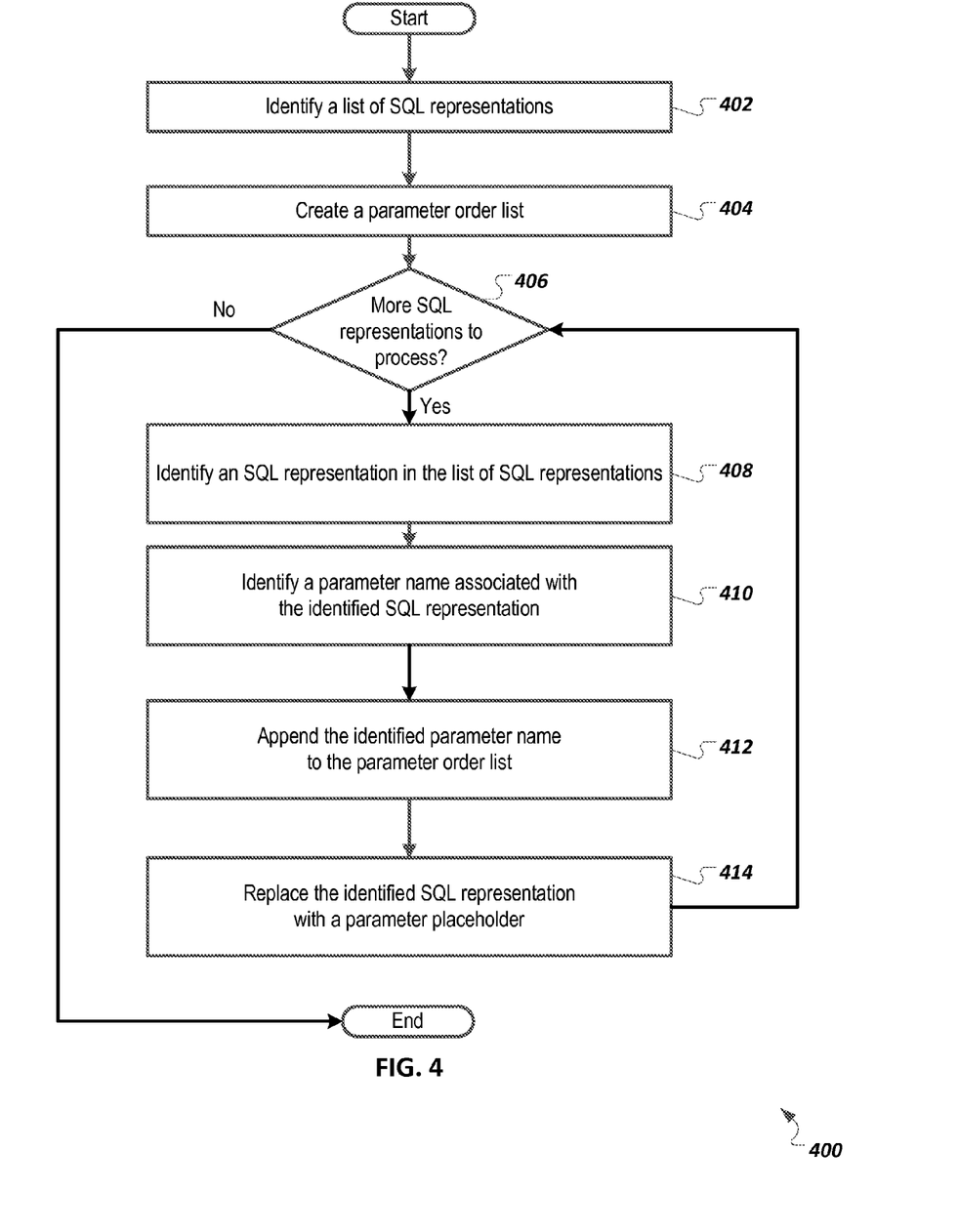
FIG. 4 is a flowchart of an example method for generating a prepared query specification.

FIG. 4 is a flowchart of an example method 400 for generating a prepared query specification. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by a system 600 described below with respect to FIG. 6.

At 402, a list of SQL representations of generated random values is identified. For example, a list of SQL representations of generated random values can be generated from the stored associations between parameter placeholders and corresponding SQL representations of generated random values that are stored from execution of operation 314 of the method 300. For example, the SQL representations can be retrieved from an associative array. The list of SQL representations can be generated, for example, using a regular expression which denotes a union of all of the SQL representations from the associative array. The list can be generated, for example, by applying the regular expression to a translated output query, such as a translated output query generated by operation 110 of the process 100 described above.

At 404, a parameter order list is generated. For example, a list data structure that is initially empty can be created.

At 406, a determination is made as to whether there are more SQL representations to process. For example, the method 400 can be configured to process each SQL representation in the list of SQL representations. A determination can be made as to whether each SQL representation in the list of SQL representations has been processed. If there are no more SQL representations to process, the method 400 ends.

If there are more SQL representations to process, an SQL representation is identified at 408. For example, a next unprocessed SQL representation in the list of SQL representations can be identified.

At 410, a parameter name associated with the identified SQL representation is identified. For example, the parameter name can be retrieved by looking up a parameter name corresponding to the identified SQL representation in the stored associations between parameter placeholders and corresponding SQL representations of generated random values. For example, the associations may be stored in an associative array that is indexed by SQL representations.

At 412, the parameter name is appended to the parameter order list. For example, the parameter name can be appended using an "add" or similar operation of the parameter order list. The add operation can add the parameter name to the parameter order list after any other parameter names which may be included in the list.

At 414, the identified SQL representation of the generated random value is replaced within the translated output query with a corresponding SQL placeholder value. If the SQL representation of the generated random value corresponds to a non-list parameter, the SQL representation can be replaced within the translated output query with a '?' character. If the SQL representation of the generated random value corresponds to a list parameter, the SQL representation can be replaced within the translated output query with a string expression of "?@@"+parameter_name+"@@?". The resulting translated output query can be referred to as an SQL query with placeholders.

After completion of the method 400, the SQL query with placeholders has each of the SQL representations of generated random values replaced with corresponding SQL placeholder values. The resulting SQL query with placeholders and the parameter order list can be used as a prepared query specification. The prepared query specification can be executed at run time.

Figure 5:
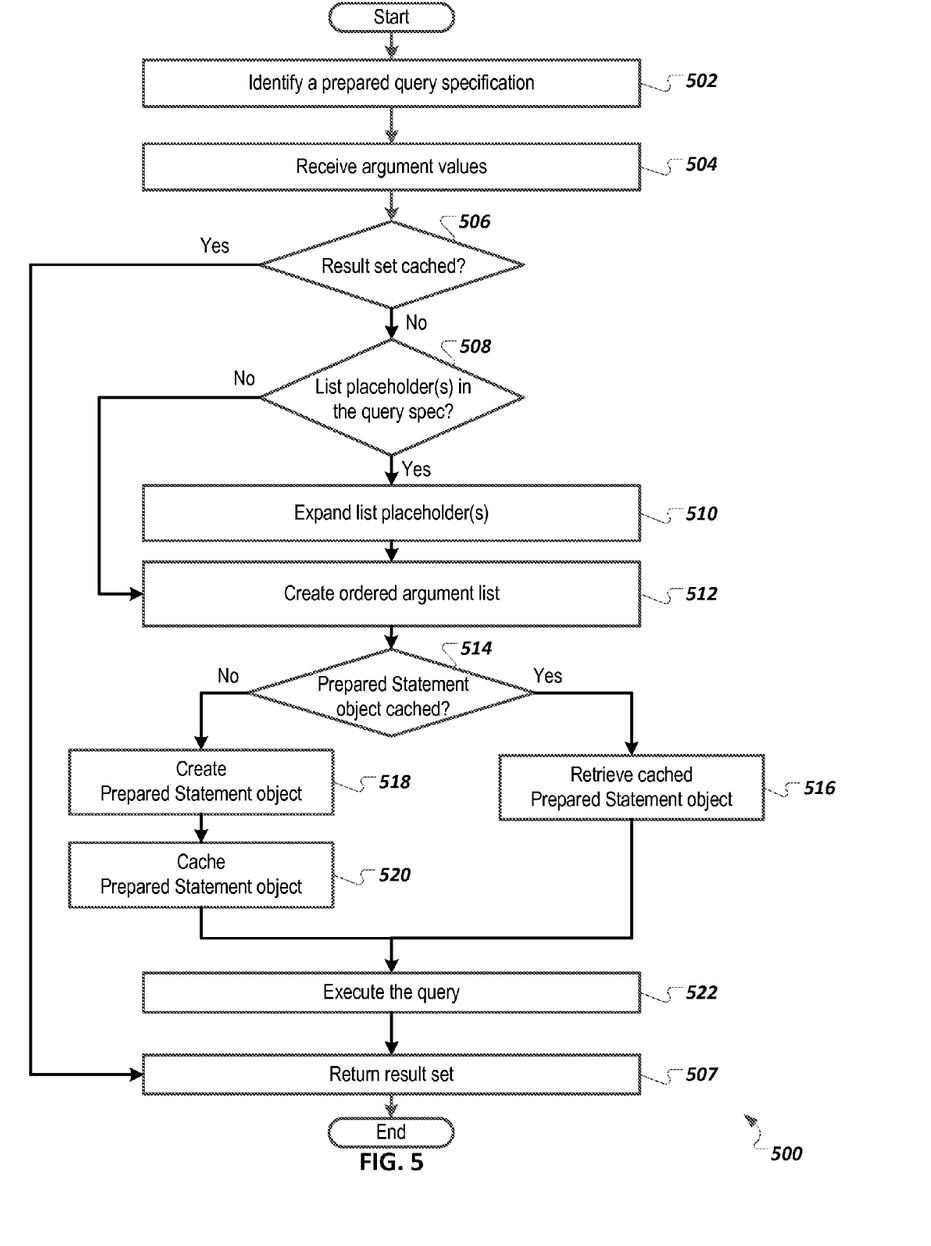
FIG. 5 is a flowchart of an example method for executing a query.

FIG. 5 is a flowchart of an example method 500 for executing a query. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by a system 600 described below with respect to FIG. 6.

At 502, a prepared query specification is identified. For example, a prepared query specification generated using the method 400 can be identified. The prepared query specification can be identified, for example, in response to a request to execute a query associated with a particular prepared query specification. The prepared query specification can include an ordered parameter list and an SQL query with placeholders.

At 504, argument values are received. For example, an argument value for each parameter included in the prepared query specification can be received, such as through a user interface or from a computer process or system. The argument values can be received in association with the request to execute the query associated with the identified prepared query specification. A list of argument values can be received for each parameter that is a list parameter.

At 506, a determination is made as to whether a result set is cached for the identified prepared query specification. For example, query result sets can be cached after query execution. If a same prepared query specification has been executed before and the result set cache has not been cleared since execution of the query (e.g., the result set cache can be cleared after a database write or after a restart of a database connection), a result set can be retrieved from the cache rather than re-executing the query. If a result set is cached for the prepared query specification, the result set is returned, at 507, and the method 500 ends.

If the result set is not cached for the prepared query specification, at 508, a determination is made as to whether the prepared query specification includes one or more list placeholder values. If the prepared query specification includes one or more list placeholder values, at 510, the one or more list placeholder values are expanded. For example, for each list placeholder, argument values corresponding to the list and a parameter list length can be identified. The list placeholder value (e.g., "?@@"+parameter_name+"@@?") can be replaced with a list of single-value SQL placeholders (e.g., "?"), with the list of single-value SQL placeholders having a length equal to the identified parameter list length.

At 512, an ordered argument list is created. For example, for each parameter name included in the parameter order list included in the prepared query specification, a corresponding argument value included in the received argument values can be added to an ordered argument list object. If an argument value is a list of values, the list of values can be split and individual values from the list of values can be added to the ordered argument list, in the same order as in the list of values.

At 514, a determination is made as to whether a cached prepared statement object exists for the prepared query specification. If a cached prepared statement object exists for the prepared query specification, the cached prepared statement object is retrieved, at 516.

If a cached prepared statement object does not exist for the prepared query specification, at 518, a prepared statement object is created, using the ordered argument list and the SQL query with placeholders included in the prepared query specification. In some implementations, a JDBC® (Java™ Data-Base Connectivity) PreparedStatement object is created.

At 520, the prepared statement object is cached (e.g., to save processing time for future executions of the prepared query specification). For example, caching can result in compilation time occurring once for each prepared query specification for each database connection lifetime. If a database connection is dropped, the cached of prepared statement objects can be cleared, to ensure validity of prepared statement objects in the cache.

At 522, the query associated with the prepared query specification is executed. Each argument included in the ordered argument list can be passed in sequence during execution. At 507, a result set is returned, such as to a requestor of the query execution.

Figure 6:
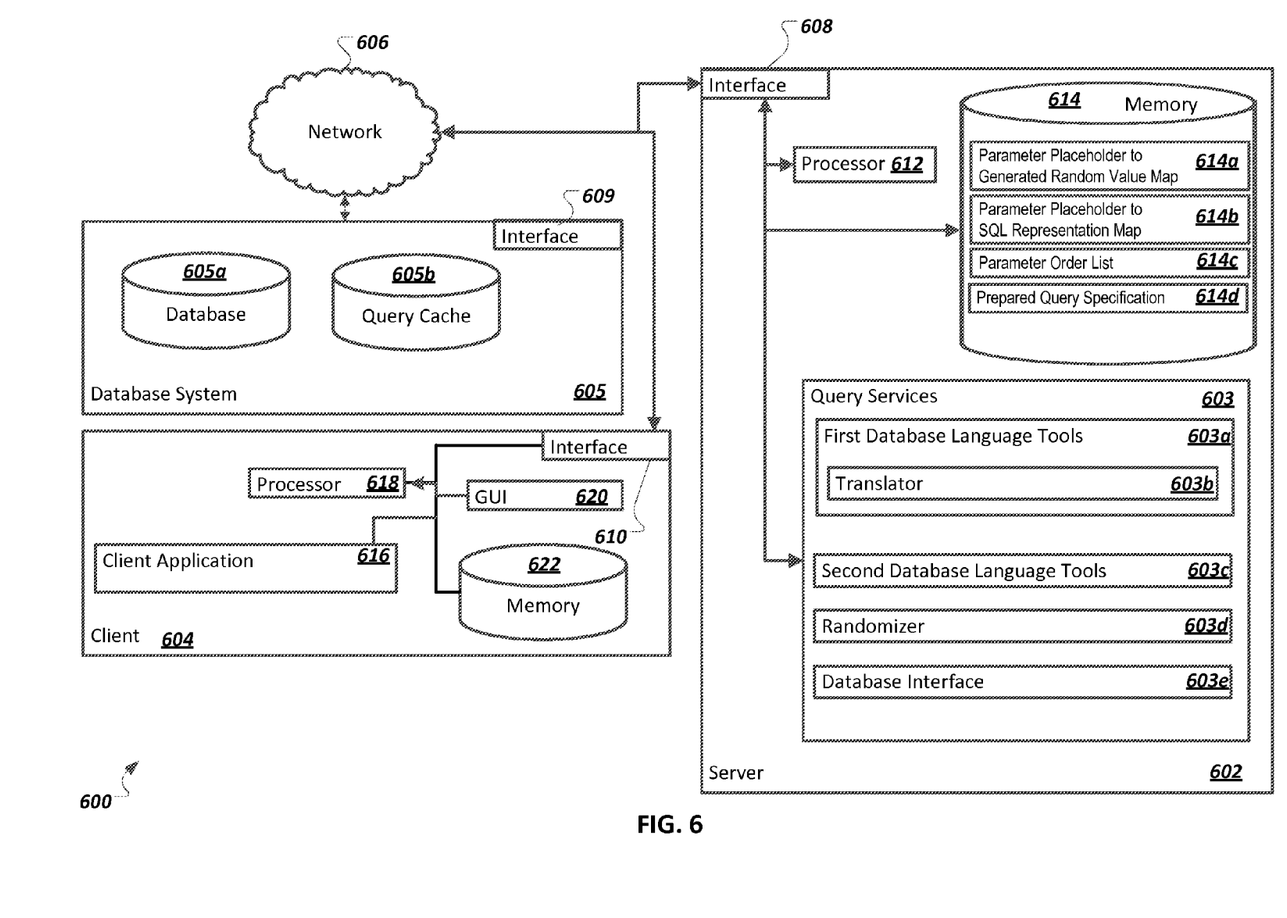
FIG. 6 is a block diagram illustrating an example system for operating on database queries.

FIG. 6 is a block diagram illustrating an example system 600 for operating on database queries. Specifically, the illustrated system 600 includes or is communicably coupled with a server 602, a client device 604, a database system 605, and a network 606. Although shown separately, in some implementations, functionality of two or more systems or servers may be provided by a single system or server.

As used in the present disclosure, the term "computer" is intended to encompass any suitable processing device. For example, although FIG. 6 illustrates a single server 602, a single client 604, and a single database system 605, the system 600 can be implemented using a single, stand-alone computing device, two or more servers 602, two or more database systems 605, or two or more clients 604. Indeed, the server 602 and the client device 604 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 602 and the client device 604 may be adapted to execute any operating system, including Linux, UNIX, Windows, Mac OS®, Java™, Android™, iOS or any other suitable operating system. According to one implementation, the server 602 may also include or be communicably coupled with an e-mail server, a Web server, a caching server, a streaming data server, and/or other suitable server.

Interfaces 608, 609, and 610 are used by the server 602, the database system 605, and the client device 604, respectively, for communicating with other systems in a distributed environment—including within the system 600—connected to the network 606. Generally, the interfaces 608, 609, and 610 each comprise logic encoded in software and/or hardware in a suitable combination and operable to communicate with the network 606. More specifically, the interfaces 608, 609, and 610 may each comprise software supporting one or more communication protocols associated with communications such that the network 606 or interface's hardware is operable to communicate physical signals within and outside of the illustrated system 600.

The server 602 includes one or more processors 612. Each processor 612 may be a central processing unit (CPU), a blade, an application specific integrated circuit (ASIC), a field-programmable gate array (FPGA), or another suitable component. Generally, each processor 612 executes instructions and manipulates data to perform the operations of the server 602. Specifically, each processor 612 executes the functionality required to receive and respond to requests from the client device 604, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 6 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 602 includes memory 614. In some implementations, the server 602 includes multiple memories. The memory 614 includes a parameter placeholder to generated random values map 614a (e.g., an associative array), a parameter placeholder to SQL representation of generated random values map 614b (e.g., an associative array), a parameter order list 614c, and a prepared query specification 614d. The memory 614 may include any type of memory or database module and may take the form of volatile and/or non-volatile memory including, without limitation, magnetic media, optical media, random access memory (RAM), read-only memory (ROM), removable media, or any other suitable local or remote memory component. The memory 614 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 602.

The server 602 includes query services components 603, which include first database language (e.g., DSL) tools 603a, second database language (e.g., SQL tools) 603c, a randomizer 603d, and a database interface 603e. The first database language tools 603a include a translator 603b, for translating a query written in the first database language to a corresponding query written in the second database language. The randomizer 603d can generate random numbers and random characters/strings. The database interface 603e can communicate with the database system 605, such as to issue a request for a query execution.

The database system 605 includes a database 605a and a query cache 605b. The query cache 605b can include, for example, cached result sets and/or cached prepared statement objects. The database system 605 can be any type of database system. Although shown separately, in some implementations, the database system 605 is included in the server 602, and the query cache 605b and some or all of the database 605a may reside in the memory 614.

The client device 604 may generally be any computing device operable to connect to or communicate with the server 602 via the network 606 using a wireline or wireless connection. In general, the client device 604 comprises an electronic computer device operable to receive, transmit, process, and store any appropriate data associated with the system 600 of FIG. 6. The client device 604 can include one or more client applications, including an application 616. A client application is any type of application that allows the client device 604 to request and view content on the client device 604. In some implementations, a client application can use parameters, metadata, and other information received at launch to access a particular set of data from the server 602. In some instances, a client application may be an agent or client-side version of the one or more enterprise applications running on the server 602.

The client device 604 further includes one or more processors 618. Each processor 618 included in the client device 604 may be a central processing unit (CPU), an application specific integrated circuit (ASIC), a field-programmable gate array (FPGA), or another suitable component. Generally, each processor 618 included in the client device 604 executes instructions and manipulates data to perform the operations of the client device 604. Specifically, each processor 618 included in the client device 604 executes the functionality required to send requests to the server 602 and to receive and process responses from the server 602.

The client device 604 is generally intended to encompass any client computing device such as a laptop/notebook computer, wireless data port, smart phone, personal data assistant (PDA), tablet computing device, one or more processors within these devices, or any other suitable processing device. For example, the client device 604 may comprise a computer that includes an input device, such as a keypad, touch screen, or other device that can accept user information, and an output device that conveys information associated with the operation of the server 602, or the client device 604 itself, including digital data, visual information, or a graphical user interface 620.

The GUI 620 of the client device 604 interfaces with at least a portion of the system 600 for any suitable purpose, including generating a visual representation of the client application 616. In particular, the GUI 620 may be used to view and navigate various Web pages. Generally, the GUI 620 provides the user with an efficient and user-friendly presentation of business data provided by or communicated within the system. The GUI 620 may comprise a plurality of customizable frames or views having interactive fields, pull-down lists, and buttons operated by the user. The GUI 620 contemplates any suitable graphical user interface, such as a combination of a generic web browser, intelligent engine, and command line interface (CLI) that processes information and efficiently presents the results to the user visually.

Memory 622 included in the client device 604 may include any memory or database module and may take the form of volatile or non-volatile memory including, without limitation, magnetic media, optical media, random access memory (RAM), read-only memory (ROM), removable media, or any other suitable local or remote memory component. The memory 622 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 604.

There may be any number of client devices 604 associated with, or external to, the system 600. For example, while the illustrated system 600 includes one client device 604, alternative implementations of the system 600 may include multiple client devices 604 communicably coupled to the server 602 and/or the network 606, or any other number suitable to the purposes of the system 600. Additionally, there may also be one or more additional client devices 604 external to the illustrated portion of system 600 that are capable of interacting with the system 600 via the network 606. Further, the term "client", "client device" and "user" may be used interchangeably as appropriate without departing from the scope of this disclosure. Moreover, while the client device 604 is described in terms of being used by a single user, this disclosure contemplates that many users may use one computer, or that one user may use multiple computers.

The preceding figures and accompanying description illustrate example processes and computer-implementable techniques. But system 600 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 600 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method of operating on database queries, comprising:
   identifying a parameterized input query in a first database query language, wherein the parameterized input query includes one or more parameter placeholders, each parameter placeholder defining a parameter name and a declared parameter type;
   generating, for each parameter placeholder in the parameterized input query in the first database query language, a random value of the declared parameter type;
   constructing a concrete instance of the parameterized input query in the first database query language, where the concrete instance of the parameterized input query replaces each parameter placeholder with the corresponding generated random value of the declared parameter type;
   generating, from the concrete instance of the parameterized input query in the first database query language, a translated output query in a second database query language different from the first query language, the translated output query including the generated random value of the declared parameter type; and
   replacing the generated random values within the translated output query in the second database query language with a placeholder value associated with the second database query language.

2. The method of claim 1, wherein the first database query language is a Domain Specific Language (DSL) and the second database query language is a Structured Query Language (SQL).

3. The method of claim 2, wherein the DSL is an extension of an ActiveRecord query language from a Ruby on Rails framework.

4. The method of claim 1, wherein the second database query language is a Structured Query Language (SQL) and wherein generating the random value of the declared parameter type for each parameter placeholder in the parameterized input query in the first database query language includes:
   generating a first random value for a first parameter placeholder in the parameterized input query;
   generating a SQL representation of the generated first random value;
   confirming the SQL representation of the generated first random value is not a substring of the translated output query, not a substring of any of the other generated SQL representations of random values associated with the other parameter placeholders, and does not contain as a substring any of the other generated SQL representations of random values associated with the other parameter placeholders;
   storing an association between the parameter placeholder and the generated first random value; and
   storing an association between the parameter placeholder and the SQL representation of the generated first random value.

5. The method of claim 4, further comprising generating an error condition in response to attempting to generate a random value for a parameter more than a threshold number of times.

6. The method of claim 1 wherein replacing the generated random values within the translated output query in the second database query language with a placeholder value associated with the second database query language comprises using a regular expression to identify the generated random values within the translated output query.

7. The method of claim 1 wherein the parameter type is a non-list parameter type and the placeholder value associated with the second database query language is a single-character placeholder value.

8. The method of claim 1 wherein the parameter type is a list parameter type and the placeholder value associated with the second database query language is a multiple-character placeholder value.

9. The method of claim 1, further comprising saving a query record in a cache, wherein the query record relates the parameterized input query to the translated output query.

10. The method of claim 1, wherein the one or more parameter placeholders includes a first parameter that is a list-valued parameter, the method further comprising replacing a parameter placeholder that corresponds to the list-valued parameter in the translated output query with a sequence of single-character placeholder values.

11. A system comprising:
    one or more computers associated with an enterprise portal; and
    a computer-readable medium coupled to the one or more computers having instructions stored thereon which, when executed by the one or more computers, cause the one or more computers to perform operations comprising:
       identifying a parameterized input query in a first database query language, wherein the parameterized input query includes one or more parameter placeholders, each parameter placeholder defining a parameter name and a declared parameter type;
       generating, for each parameter placeholder in the parameterized input query in the first database query language, a random value of the declared parameter type;
       constructing a concrete instance of the parameterized input query in the first database query language, where the concrete instance of the parameterized input query replaces each parameter placeholder with the corresponding generated random value of the declared parameter type;

generating, from the concrete instance of the parameterized input query in the first database query language, a translated output query in a second database query language different from the first query language, the translated output query including the generated random value of the declared parameter type; and replacing the generated random values within the translated output query in the second database query language with a placeholder value associated with the second database query language.

12. The system of claim 11, wherein the first database query language is a Domain Specific Language (DSL) and the second database query language is a Structured Query Language (SQL).

13. The system of claim 12, wherein the DSL is an extension of an ActiveRecord query language from a Ruby on Rails framework.

14. The system of claim 10, wherein the second database query language is a Structured Query Language (SQL) and wherein generating the random value of the declared parameter type for each parameter placeholder in the parameterized input query in the first database query language includes:

generating a first random value for a first parameter placeholder in the parameterized input query;

generating a SQL representation of the generated first random value;

confirming the SQL representation of the generated first random value is not a substring of the translated output query, not a substring of any of the other generated SQL representations of random values associated with the other parameter placeholders, and does not contain as a substring any of the other generated SQL representations of random values associated with the other parameter placeholders;

storing an association between the parameter placeholder and the generated first random value; and storing an association between the parameter placeholder and the SQL representation of the generated first random value.

15. The system of claim 4, the operations further comprising generating an error condition in response to attempting to generate a random value for a parameter more than a threshold number of times.

16. A computer program product encoded on a non-transitory storage medium, the product comprising non-transitory, computer readable instructions for causing one or more processors to perform operations comprising:

identifying a parameterized input query in a first database query language, wherein the parameterized input query includes one or more parameter placeholders, each parameter placeholder defining a parameter name and a declared parameter type;

generating, for each parameter placeholder in the parameterized input query in the first database query language, a random value of the declared parameter type;

constructing a concrete instance of the parameterized input query in the first database query language, where the concrete instance of the parameterized input query replaces each parameter placeholder with the corresponding generated random value of the declared parameter type;

generating, from the concrete instance of the parameterized input query in the first database query language, a translated output query in a second database query language different from the first query language, the translated output query including the generated random value of the declared parameter type; and replacing the generated random values within the translated output query in the second database query language with a placeholder value associated with the second database query language.

17. The product of claim 16, wherein the first database query language is a Domain Specific Language (DSL) and the second database query language is a Structured Query Language (SQL).

18. The product of claim 17, wherein the DSL is an extension of an ActiveRecord query language from a Ruby on Rails framework.

19. The product of claim 16, wherein the second database query language is a Structured Query Language (SQL) and wherein generating the random value of the declared parameter type for each parameter placeholder in the parameterized input query in the first database query language includes:

generating a first random value for a first parameter placeholder in the parameterized input query;

generating a SQL representation of the generated first random value;

confirming the SQL representation of the generated first random value is not a substring of the translated output query, not a substring of any of the other generated SQL representations of random values associated with the other parameter placeholders, and does not contain as a substring any of the other generated SQL representations of random values associated with the other parameter placeholders;

storing an association between the parameter placeholder and the generated first random value; and storing an association between the parameter placeholder and the SQL representation of the generated first random value.

20. The product of claim 16, the operations further comprising generating an error condition in response to attempting to generate a random value for a parameter more than a threshold number of times.

* * * * *